(12) United States Patent
Jiang et al.

(10) Patent No.: US 11,062,469 B2
(45) Date of Patent: Jul. 13, 2021

(54) 4D TRACKING UTILIZING DEPTH DATA FROM MULTIPLE 3D CAMERAS

(71) Applicant: Microsoft Technology Licensing, LLC, Redmond, WA (US)

(72) Inventors: Hao Jiang, Bellevue, WA (US); Quanzeng You, Rochester, NY (US); Zhengyou Zhang, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 229 days.

(21) Appl. No.: 15/974,370

(22) Filed: May 8, 2018

(65) Prior Publication Data

US 2019/0279382 A1 Sep. 12, 2019

Related U.S. Application Data

(60) Provisional application No. 62/641,202, filed on Mar. 9, 2018, provisional application No. 62/643,108, filed on Mar. 14, 2018.

(51) Int. Cl.
| | |
|---|---|
| *G06T 7/00* | (2017.01) |
| *G06T 7/55* | (2017.01) |
| *G06K 9/00* | (2006.01) |
| *G06T 15/08* | (2011.01) |

(Continued)

(52) U.S. Cl.
CPC ............ *G06T 7/55* (2017.01); *G06K 9/00201* (2013.01); *G06K 9/00214* (2013.01);
(Continued)

(58) Field of Classification Search
CPC ........... G06T 7/55; G06T 7/292; G06T 15/08; G06T 17/00; G06T 2200/04; G06T 2200/08; G06T 2207/10016; G06T 2207/10024; G06T 2207/10028; G06T 2207/20081; G06T 2207/20084; G06T 2207/30196; G06T 2207/30241;
(Continued)

(56) References Cited

U.S. PATENT DOCUMENTS

2009/0244309 A1\* 10/2009 Maison .............. G06K 9/00369
348/222.1
2013/0155058 A1 6/2013 Golparvar-Fard et al.
(Continued)

FOREIGN PATENT DOCUMENTS

| WO | 2016182551 A1 | 11/2016 |
|---|---|---|
| WO | 2017220966 A1 | 12/2017 |

OTHER PUBLICATIONS

Dou, et al., "Fusion4D: Real-time Performance Capture of Challenging Scenes", In Journal of ACM Transactions on Graphics, vol. 35, Issue 4, Jul. 24, 2016, 13 Pages.
(Continued)

*Primary Examiner* — Pakee Fang
(74) *Attorney, Agent, or Firm* — Rainier Patents, P.S.

(57) ABSTRACT

The discussion relates to 4D tracking. One example can utilize multiple 3D cameras positioned relative to an environment to sense depth data of the environment from different viewpoints over time. The example can process the depth data to construct 3D solid volume representations of the environment, select subjects from the 3D solid volume representations, and recognize actions of the selected subjects.

20 Claims, 13 Drawing Sheets

(51) Int. Cl.
  *G06T 7/292* (2017.01)
  *G06K 9/62* (2006.01)
  *G06T 17/00* (2006.01)
  *G06K 9/46* (2006.01)

(52) U.S. Cl.
  CPC ..... *G06K 9/00335* (2013.01); *G06K 9/00369* (2013.01); *G06K 9/00771* (2013.01); *G06K 9/629* (2013.01); *G06T 7/292* (2017.01); *G06T 15/08* (2013.01); *G06T 17/00* (2013.01); *G06K 9/4628* (2013.01); *G06T 2200/04* (2013.01); *G06T 2200/08* (2013.01); *G06T 2207/10016* (2013.01); *G06T 2207/10024* (2013.01); *G06T 2207/10028* (2013.01); *G06T 2207/20081* (2013.01); *G06T 2207/20084* (2013.01); *G06T 2207/30196* (2013.01); *G06T 2207/30241* (2013.01)

(58) Field of Classification Search
  CPC ........... G06K 9/00201; G06K 9/00214; G06K 9/00335; G06K 9/00369; G06K 9/00771; G06K 9/629; G06K 9/4628
  See application file for complete search history.

(56) References Cited

U.S. PATENT DOCUMENTS

| | | | |
|---|---|---|---|
| 2014/0148733 | A1 | 5/2014 | Stone et al. |
| 2017/0109611 | A1 | 4/2017 | Luo |
| 2017/0347120 | A1 | 11/2017 | Chou et al. |
| 2018/0046649 | A1 | 2/2018 | Dal Mutto et al. |
| 2019/0180409 | A1* | 6/2019 | Moloney .......... G06T 15/08 |

OTHER PUBLICATIONS

Hickson, et al., "Semantic Instance Labeling Leveraging Hierarchical Segmentation", In Proceedings of the IEEE Winter Conference on Applications of Computer Vision, Jan. 5, 2015, pp. 1068-1075.

Pagnutti, et al., "Segmentation and Semantic Labeling of RGBD Data with Convolutional Neural Networks and Surface Fitting", In Journal of IET Computer Vision, vol. 11, Issue 8, Dec. 1, 2017, 19 Pages.

Withanage, et al., "Fall Recovery Subactivity Recognition With RGB-D Cameras", In Proceedings of the IEEE Transactions on Industrial Informatics vol. 12, Issue 6, Dec. 1, 2016, 9 Pages.

Papadopoulos, et al., "Human Action Recognition Using 3D Reconstruction Data", In Proceedings of the IEEE Transactions on Circuits and Systems for Video Technology vol. 28, Issue 8, Dec. 21, 2016, 17 Pages.

"International Search Report and Written Opinion Issued in PCT Application No. PCT/US2019/020178", dated May 13, 2019, 13 Pages.

Pongsagorn, et al., "High level fusion of profile-based human action recognition using multi-view RGBD information", In Proceedings of the 12th International Joint Conference on Computer Science and Software Engineering (JCSSE), Jul. 22, 2015, 4 Pages.

* cited by examiner

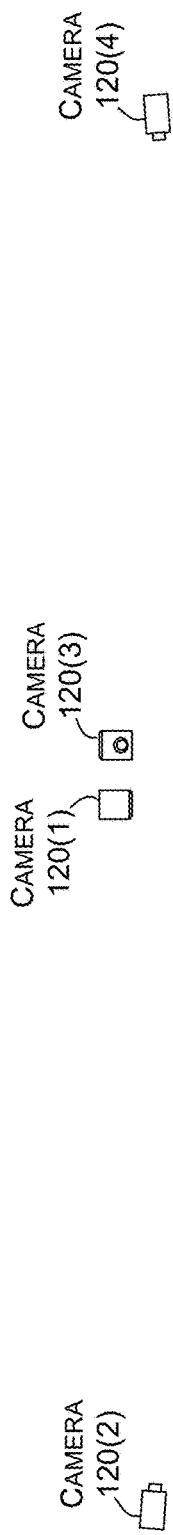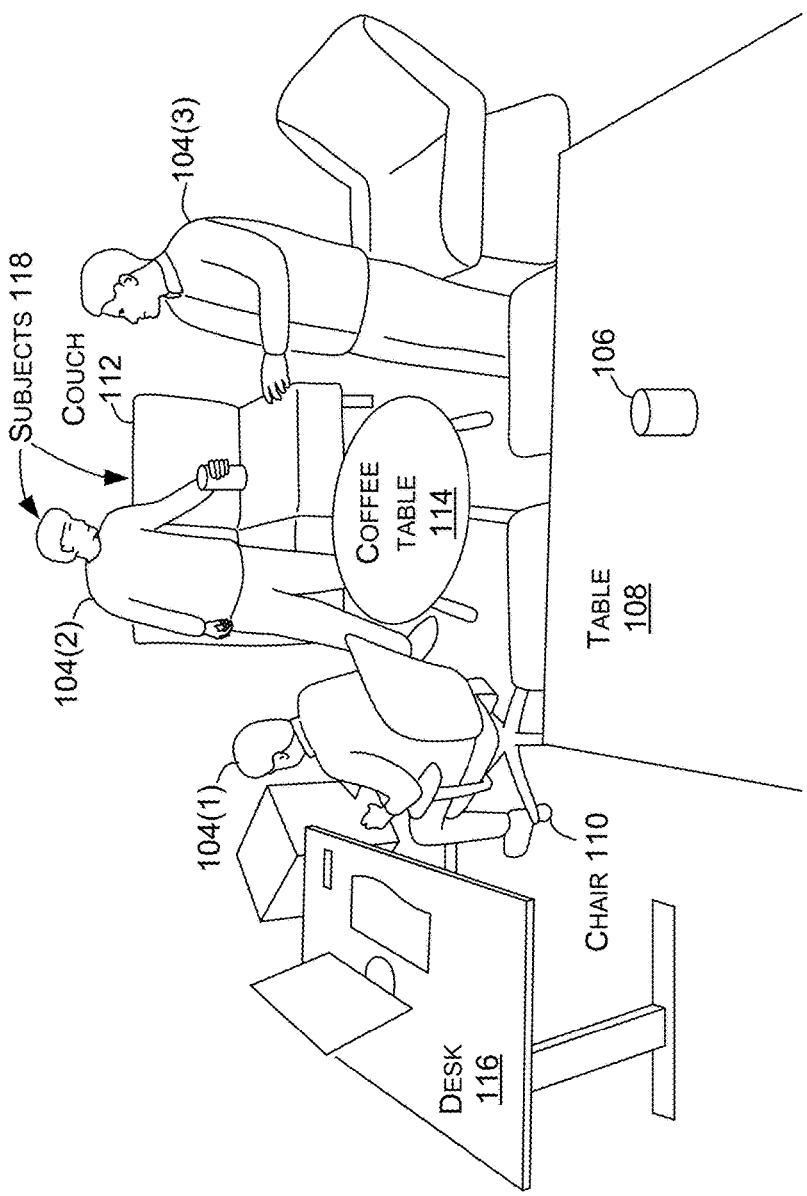
FIG. 1A

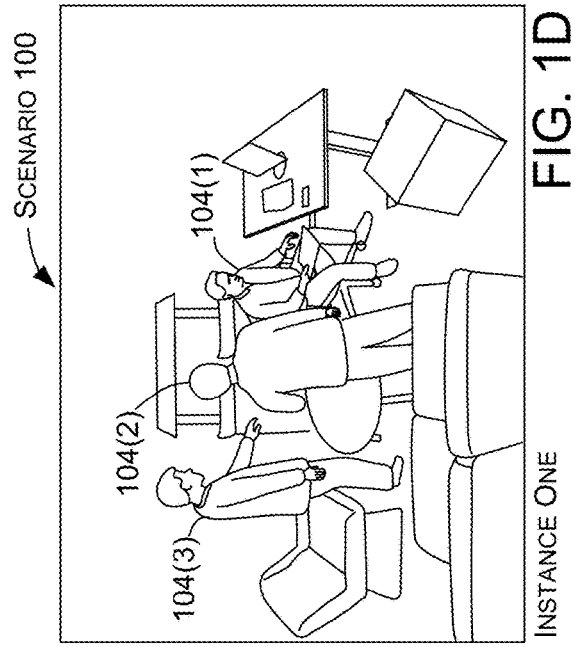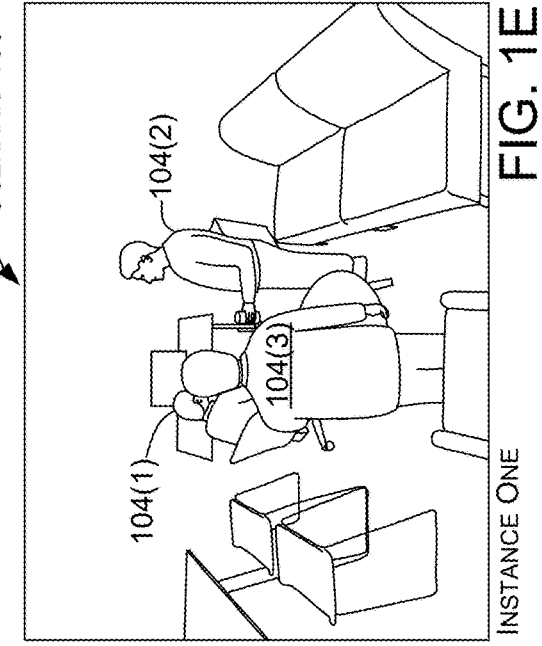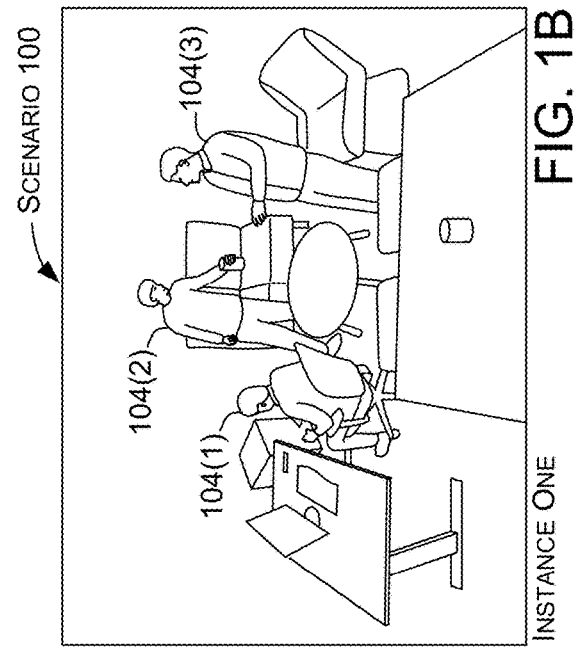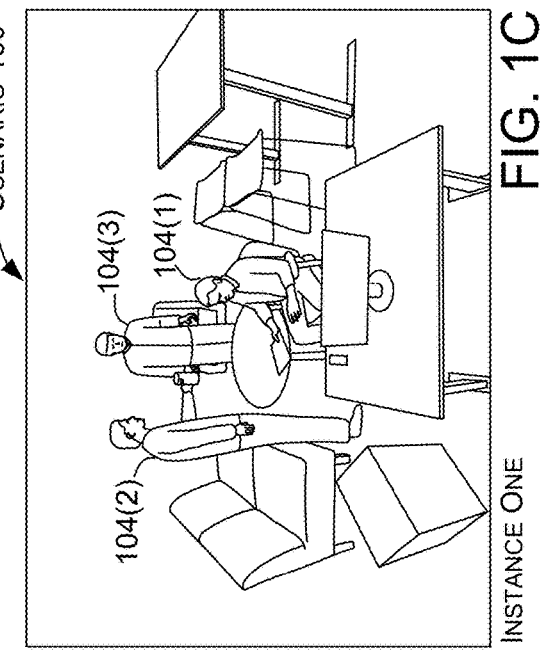

INSTANCE ONE

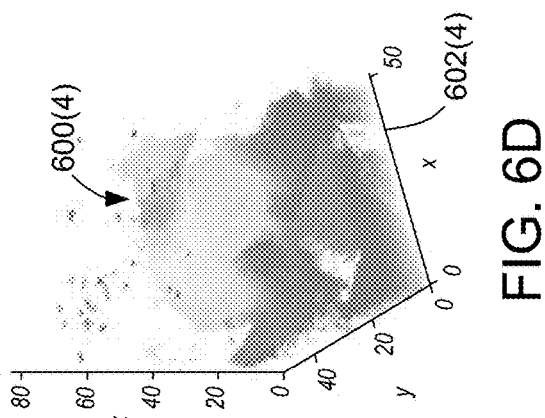
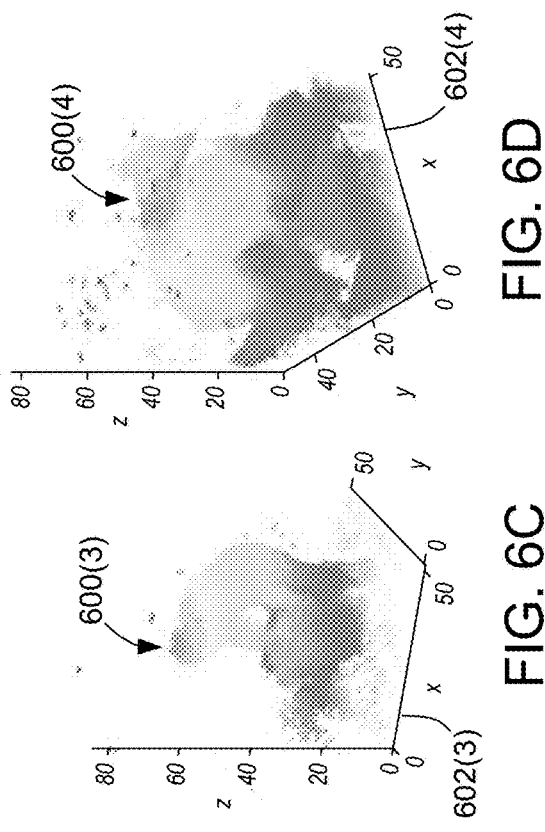
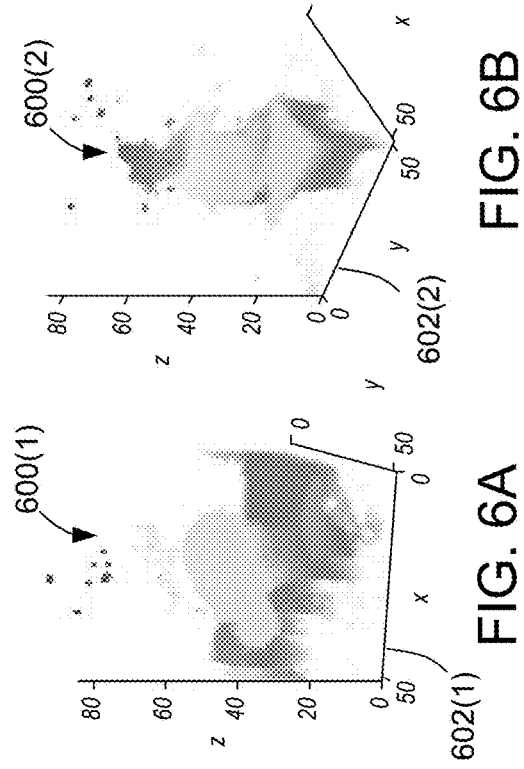
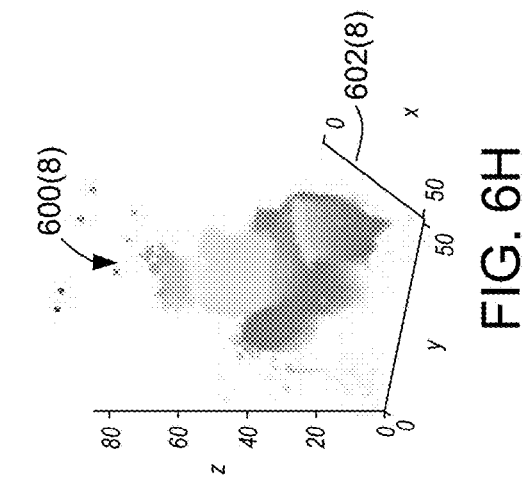
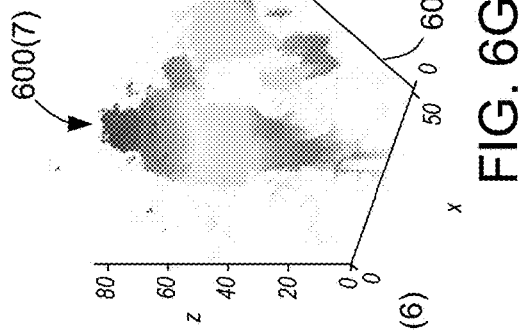
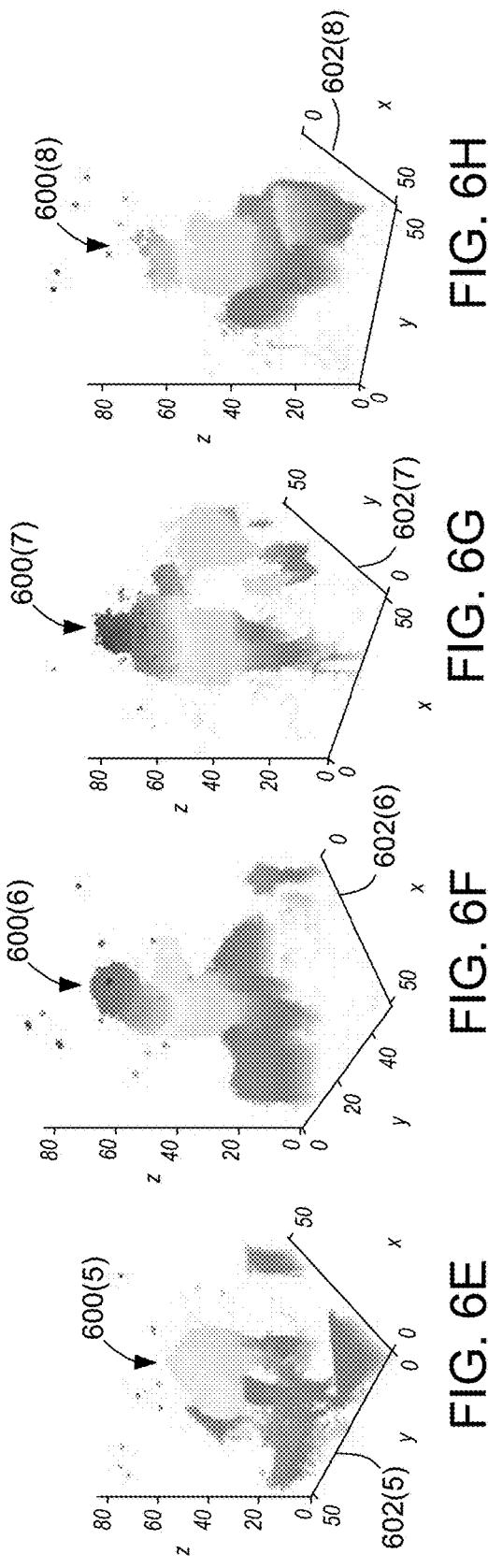

4D TRACKING UTILIZING DEPTH DATA FROM MULTIPLE 3D CAMERAS

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. In some cases, parentheticals are utilized after a reference number to distinguish like elements. Use of the reference number without the associated parenthetical is generic to the element. Further, the left-most numeral of each reference number conveys the figure and associated discussion where the reference number is first introduced.

FIGS. 1A-1E, 2A-2E, 3, 4A-4C, and 6A-6H collectively show an example 4D dynamic solid modeling scenario in accordance with some implementations of the present concepts.

DETAILED DESCRIPTION

Overview

Figure 2A:
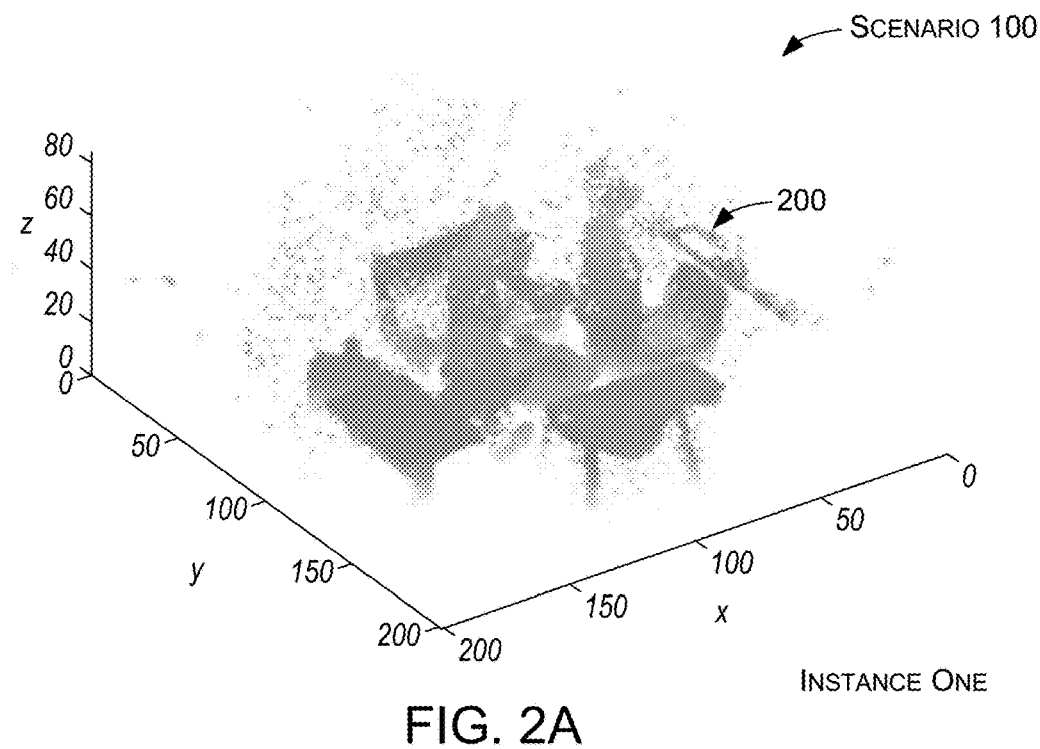

Recognizing the actions of people in a crowded and cluttered environment is a challenging computer vision task. This description relates to tracking actions of people and/or objects utilizing multiple three-dimensional (3D) cameras. Depth data from the multiple 3D cameras can be used to determine which voxels in an environment are occupied by a person or object. Voxel occupancy can be used to construct solid volume data, as opposed to simply outlining surfaces of people or objects. Taken one step further, collecting the depth data from the multiple 3D cameras over time can be used to perform 4D dynamic solid modeling of the whole space. With the added dimension of time, 4D dynamic solid modeling can efficiently and accurately identify real-time actions and/or behaviors of people, pets, robots, cars, etc., and their interactions with objects in the environment. The present 4D dynamic solid modeling concepts can be implemented in almost any use case scenario, even including large-scale, cluttered environments, such as a crowded store, a busy factory, or even a fast-paced city block. For purposes of explanation, the description first turns to a relatively simple office scenario.

Example Scenario

FIGS. 1A-1E, 2A-2E, 3, 4A-4C, and 6A-6H collectively show an example 4D dynamic solid modeling (4D DSM) scenario 100. In this case, FIG. 1A shows an environment 102 that includes three people 104 (e.g., persons). In this simple office scene, the environment 102 also contains various objects 106, such as a cup, a computer, a keyboard, papers, etc. In this example, some objects are designated with specificity to aid in the following discussion, including a table 108, a chair 110, a couch 112, a coffee table 114, and a desk 116. The scene shown in FIG. 1A can be thought of as a particular time point (e.g., snapshot in time), Instance One. People 104 and/or objects 106 may also be referred to as subjects 118.

In 4D dynamic solid modeling scenario 100, the environment 102 can also include various cameras 120. In FIG. 1A, four cameras 120 are shown. Camera 120(1) is mounted overhead in the foreground of the scene, and aimed into the drawing page. Cameras 120(2) and 120(4) are mounted overhead on the right and left side relative to the drawing page, respectively, and aimed toward the office scene. Camera 120(3) is mounted in the background of the scene. As such, the direction of the view shown in FIG. 1A is roughly similar to that of camera 120(1). Cameras 120 can be 3D cameras, which can employ any type of 3D technology, such as stereo cameras, structured light, time of flight, etc., as well as capture color images. In this case, the 3D cameras can collectively capture depth data of the scene over time (e.g., 4D data). The depth data collected over time can be used to determine successive 3D solid volume descriptions of the scene. Stated another way, the cameras 120 can be used to perform 4D dynamic solid volume sensing of the environment 102. The 4D dynamic solid volume data can be analyzed to identify actions of people and/or objects in the environment 102.

FIGS. 1B through 1E show environment 102 from the different viewpoints of cameras 120. In this case, FIG. 1B represents the view from camera 120(1), FIG. 1C represents the view from camera 120(2), FIG. 1D represents the view from camera 120(3), and FIG. 1E represents the view from camera 120(4). The images shown in FIGS. 1B through 1E also represent Instance One, having all been captured at approximately the same time. Note that the multiple camera angles provide relatively extensive coverage of the people 104 and objects 106 in the environment 102. For example, in FIG. 1E the view of person 104(1) is somewhat obscured, since person 104(3) is partially between the camera 120(4) and person 104(1). However, the data captured by cameras 120(1), 120(2), and 120(3) can collectively overcome, or at least partially remedy, deficiencies in the view of camera 120(2) in Instance One.

By combining the depth data collected from the different camera viewpoints depicted in FIGS. 1B through 1E, 4D dynamic solid modeling concepts (e.g., algorithms) can be used to determine which voxels in environment 102 are occupied by a person or other object. Once voxel occupancy is determined, a 3D solid volume representation 200 of environment 102 can be created. FIGS. 2A through 2E collectively show a 3D solid volume representation 200 of environment 102. As such, the 3D solid volume representation 200 shown in FIG. 2A can be thought of as a 3D map of voxel occupancy at the Instance One time point.

In some implementations, 4D dynamic solid modeling can be used to track people and/or objects. In order to track a person in 4D dynamic solid modeling scenario 100, the environment 102 can be partitioned into partial volumes 202, shown in FIG. 2B. In this example, the partial volumes 202 have the same height, as if they all extend from the floor to the ceiling of environment 102. In this case, each partial volume 202 contains a portion of the 3D solid volume representation 200 that includes one of the people 104. For instance, partial volume 202(1) is roughly placed around the portion of the 3D solid volume representation 200 that includes person 104(1). The portions of the 3D solid volume representation 200 included in the partial volumes 202 can also correspond to other objects or portions of objects. For instance, partial volume 202(1) also includes at least a portion of desk 116, which is proximate to person 104(1) in Instance One. Partial volumes 202 can overlap, thereby containing a common portion of the 3D solid volume representation 200. In this example, partial volume 202(2) and partial volume 202(3) overlap, as indicated at 204.

Figure 2B:
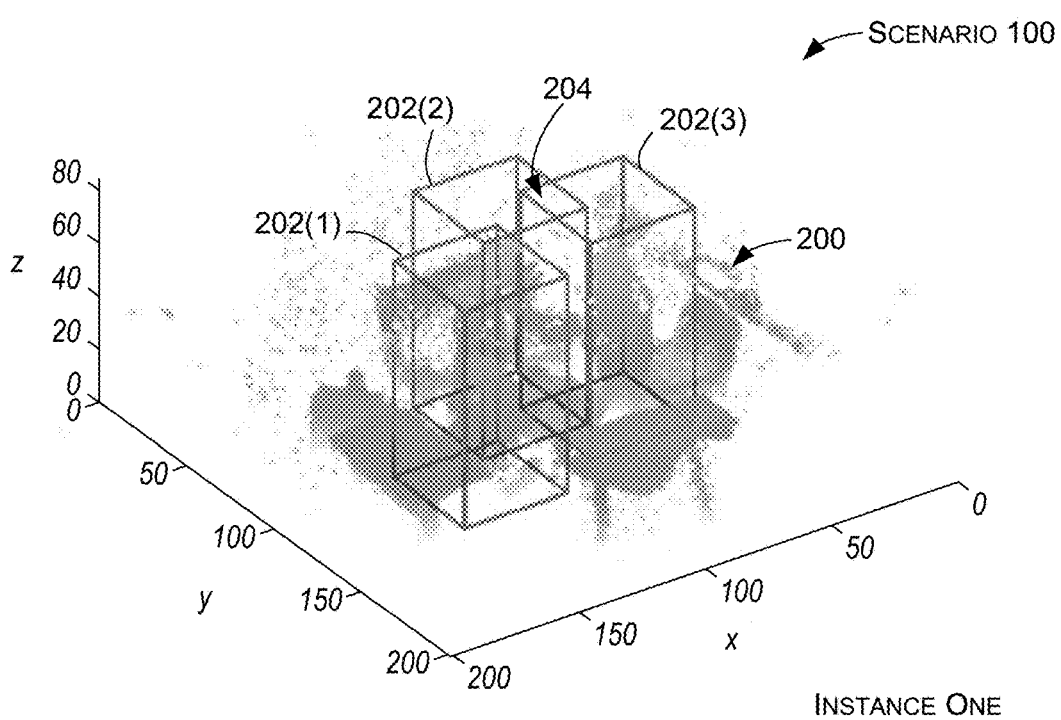
Figure 2E:
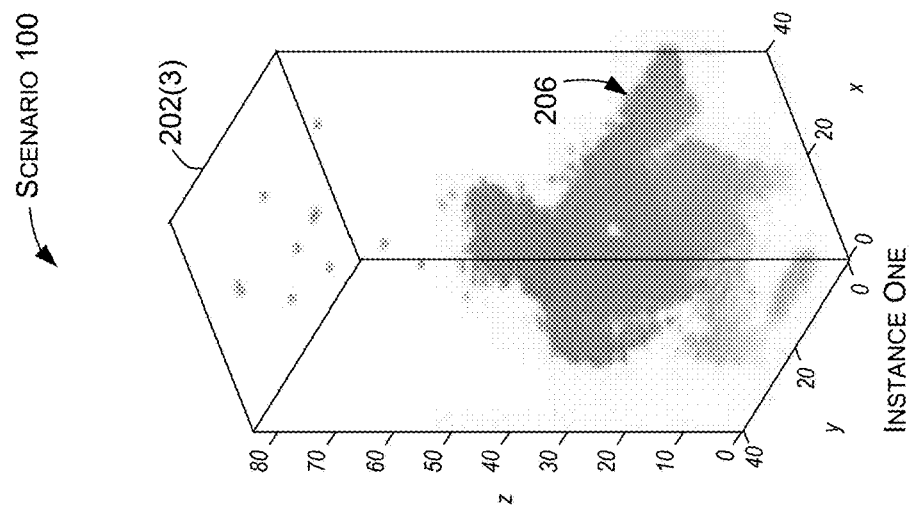
Figure 2D:
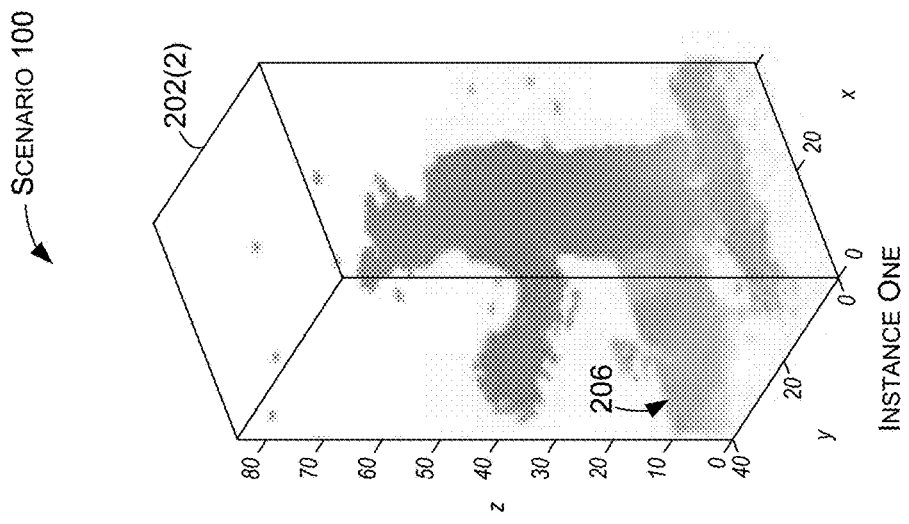
Figure 2C:
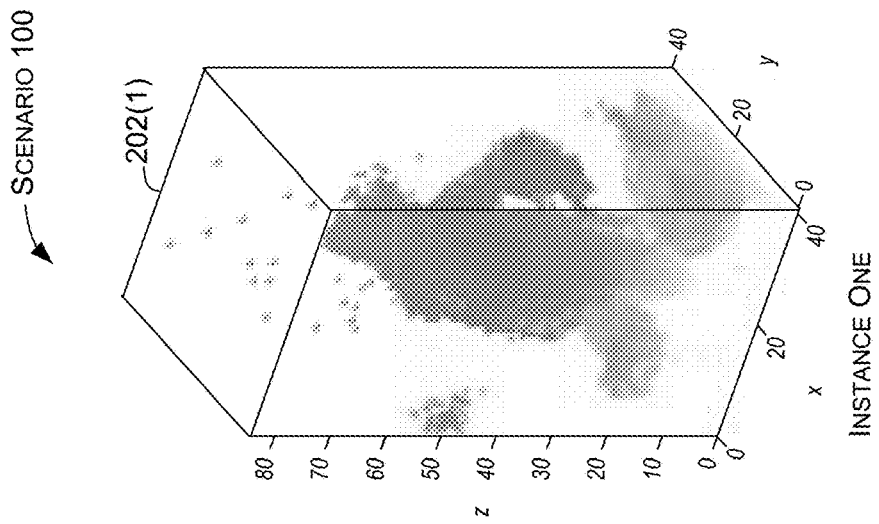

FIGS. 2C through 2E show the partial volumes 202 separated from each other. In this example, where the partial volumes 202 overlap, the common portion of the 3D solid volume representation 200 can be included in both of the separated partial volumes 202. For example, separated partial volume 202(2) and partial volume 202(3) both contain a common portion of the 3D solid volume representation 200 of the coffee table 114, indicated at 206.

In some cases, viewing the partial volumes 202 separately can help simplify the problem of tracking and/or recognizing people's actions or behaviors. For instance, viewing the partial volumes 202 separately can focus on the movements and/or actions of a single person. Also, processing the partial volumes 202 separately from the whole 3D solid volume representation 200 can reduce an amount of processing resources needed to solve the problems of tracking the person and determining the action(s) of the person.

Figure 3:
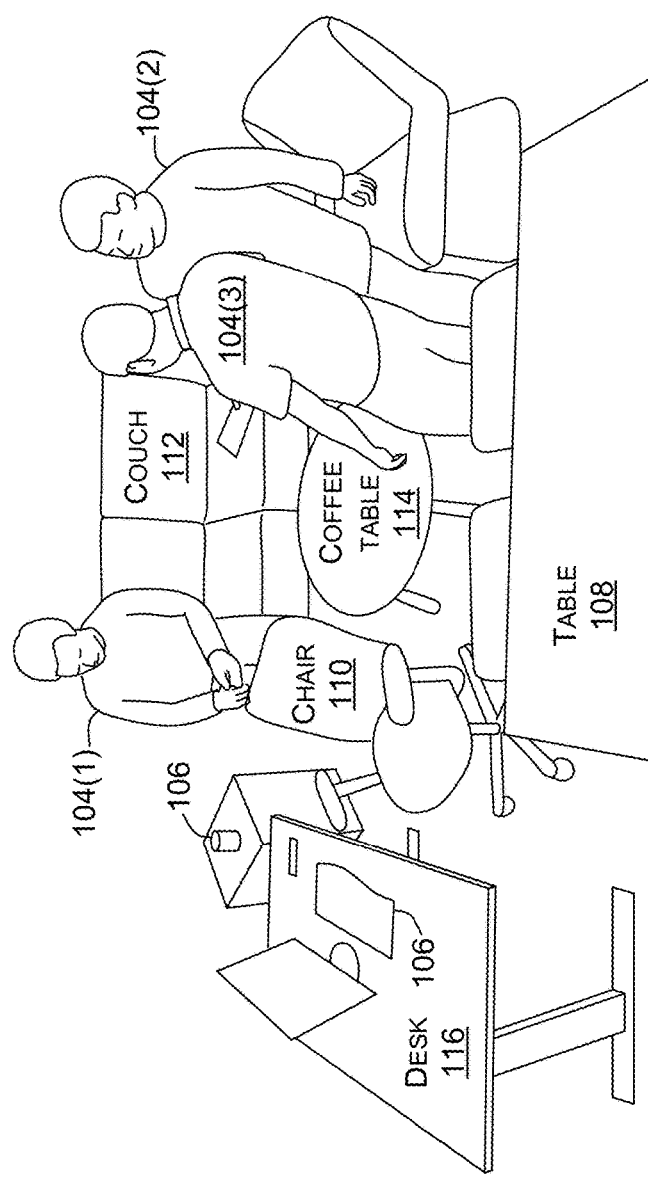

To bring the 4D dynamic solid modeling scenario 100 from 3D to 4D, images from an additional time point can be added. FIG. 3 depicts the same environment 102, but now at Instance Two, a different time point from Instance One. In Instance Two, the people 104 are located at different positions within the scene. For example, in Instance One person 104(1) is sitting in chair 110 at the desk 116, holding some papers. In Instance Two, person 104(1) is standing behind chair 110, and person 104(2) is holding the papers. At Instance Two, the multiple cameras 120 can again be used to capture depth data from multiple views of environment 102, and a new 3D solid volume representation of environment 102 can be constructed. For sake of brevity, the detail of the new 3D solid volume representation will not be repeated for Instance Two. To summarize, by repeatedly capturing depth data from the multiple cameras 120 at different time points, and constructing 3D solid volume representations for each time point captured, 4D dynamic solid modeling can be used to track people and/or objects over time, as described further relative to FIG. 4.

Figure 4C:
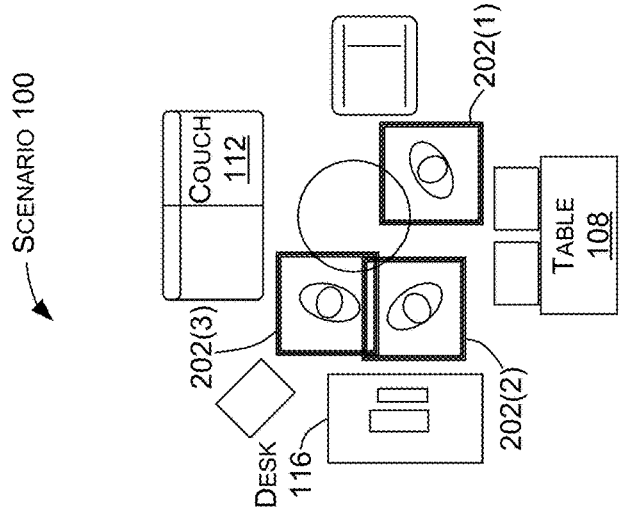
Figure 4B:
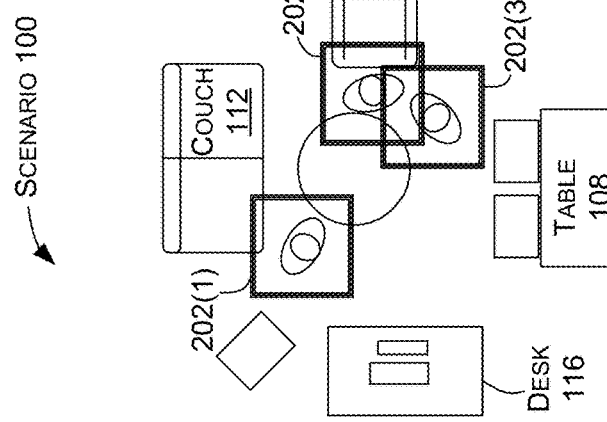
Figure 4A:
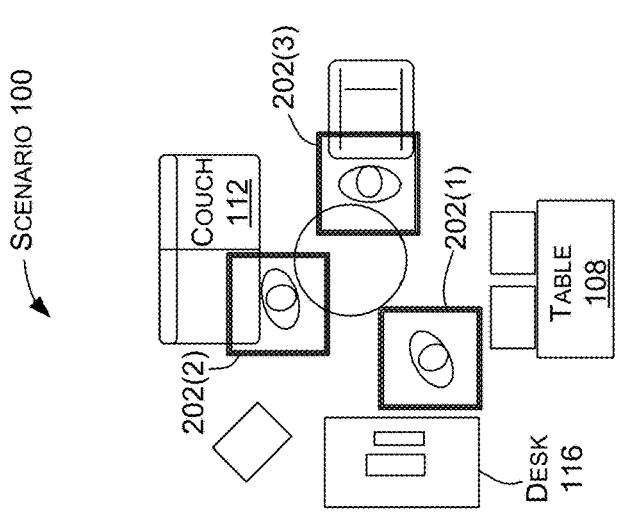

FIGS. 4A through 4C illustrate environment 102 from an overhead (e.g., top down) view. As such, FIGS. 4A through 4C show the three people 104 and objects 106, including for instance the table 108, couch 112, and desk 116 introduced above. FIGS. 4A through 4C each illustrate environment 102 at a different time point. For example, FIG. 4A shows Instance One, FIG. 4B shows Instance Two, and FIG. 4C shows a third time point, Instance Three. FIG. 4A also includes the partial volumes 202 that were introduced above relative to FIG. 2B. Note that since FIGS. 4A through 4C represent different time points, the people 104 and their respective partial volumes 202 have different locations in each FIG. Therefore, FIGS. 4A through 4C are an illustration of how the people 104 can be tracked over time using 4D dynamic solid modeling concepts. With 4D dynamic solid modeling, any partial volume can be followed over time, whether stationary or moving, to continually identify actions of people and/or objects within the partial volume.

Figure 5:
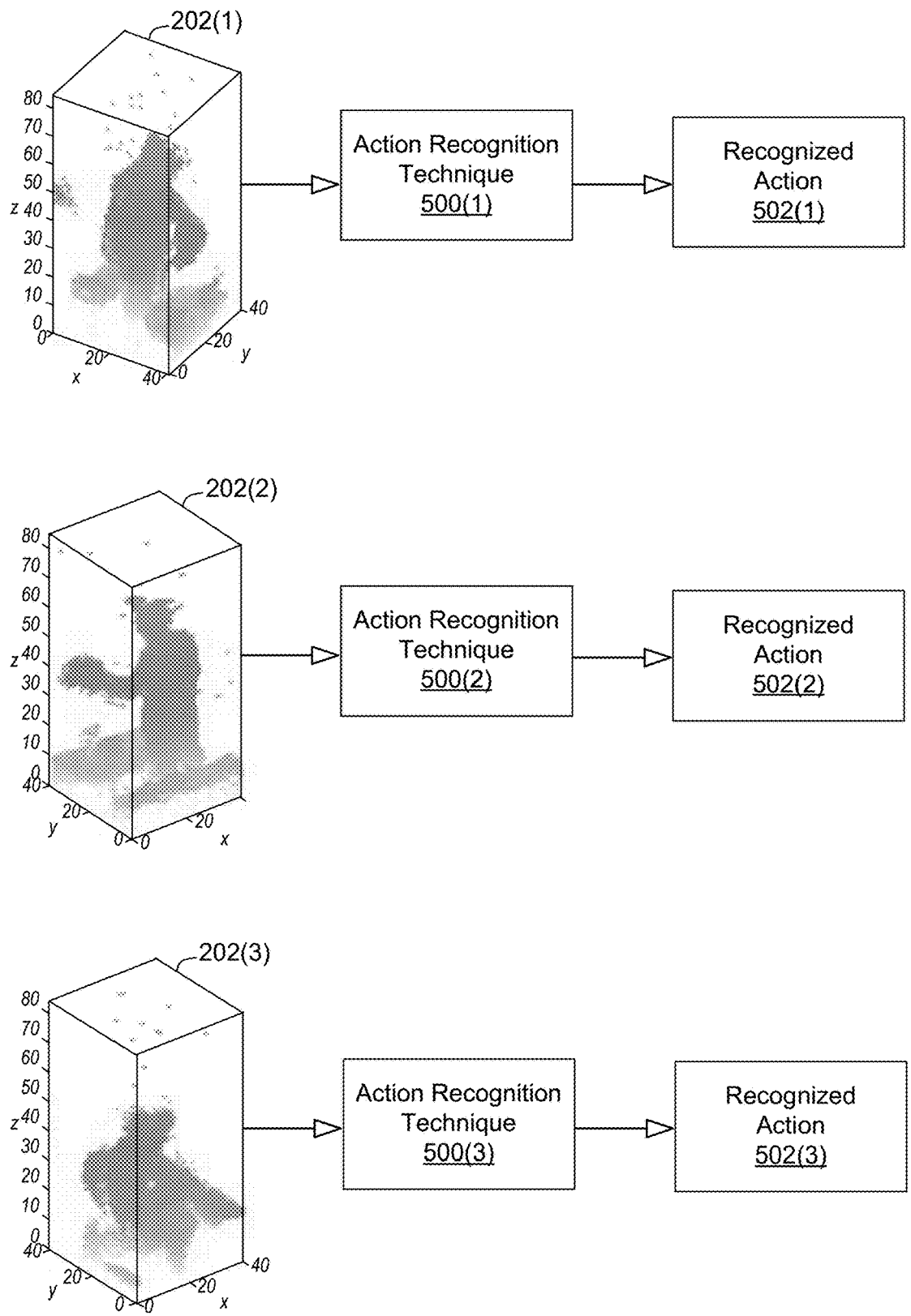
FIGS. 5 and 7-10 show example 4D dynamic solid modeling methods that can implement some of the present concepts in accordance with some implementations.

FIG. 5 provides a visualization of application of 4D dynamic solid modeling concepts. FIG. 5 includes the partial volumes 202 separated from each other, as described above relative to FIGS. 2C through 2E. FIG. 5 also includes action recognition technique 500 and recognized actions 502. As shown in FIG. 5, partial volume 202(1) can be subjected to action recognition technique 500(1). The result of action recognition technique 500(1) can be recognized action 502 (1) of person 104(1). Similarly, the result of action recognition technique 500(2) can be recognized action 502(2), and the result of action recognition technique 500(3) can be recognized action 502(3) of person 104(3). In some cases, action recognition technique 500 can be a same technique applied repeatedly to all of the partial volumes 202. In other cases the applied action recognition technique 500 can vary between partial volumes 202 and/or vary over time for a partial volume 202. Further detail of an example action recognition technique 500 will be described relative to FIG. 8, below.

FIG. 6 shows additional examples of 3D solid volume representations 600 in partial volumes 602 with people performing various actions. The examples in FIGS. 6A through 6H include 3D solid volume representations 600 of people bending, drinking, lifting, pushing/pulling, opening a drawer, reading, waving, and clapping, respectively. In these examples, the partial volumes 602 are roughly centered on a person, and many of the partial volumes 602 include portions of other objects and/or background material. Not only can 4D dynamic solid modeling concepts reliably recognize actions of people despite such clutter in an environment, in some cases these other objects and/or materials can help with recognition of the actions. For instance, detection of a chair can be used as contextual information to help recognize that a person is performing the action of sitting. The examples in FIG. 6 are just a few examples of the myriad of positions and/or poses related to actions that can be recognized with 4D dynamic solid modeling concepts.

Referring again to FIGS. 4A through 4C, with the tracking of the partial volumes 202 over time, the action recognition technique 500 introduced in FIG. 5 can be repeatedly applied over time to continue to update the recognized actions 502 of the people 104 in their respective partial volumes 202. For example, as time passes from the Instance One (FIG. 4A) to Instance Two (FIG. 4B), action recognition technique 500(1) can update the recognized action 502(1) of person 104(1) from sitting to standing. Action recognition techniques 500(2) and 500(3) can similarly continue to update recognized actions 502(2) and 502(3). In this manner, 4D dynamic solid modeling concepts can be used to build an understanding of a person's actions and/or behaviors over time.

Taken one step further, the person's actions and/or behaviors within his/her respective partial volume can be placed back into the context of the broader environment 102. Using the combined recognized actions 502 of the people 104 in the environment 102, an understanding of the interactions of people and/or objects can be built. For instance, 4D dynamic solid modeling can determine that in Instance One (e.g., FIG. 1A), person 104(2) is interacting with person 104(3) by handing person 104(3) a cup. 4D dynamic solid modeling can also determine that person 104(1), sitting at the desk 116, does not appear to be interacting with person 104(2) or person 104(3). In this manner, 4D dynamic solid modeling can begin to mimic human vision, taking in a holistic view of an environment to figure out what is happening in a scene.

The 4D dynamic solid modeling scenario 100 described above illustrates how a 4D scan, using depth data from multiple cameras over time, can be used to produce a 4D solid volume model of the scene. Rather than simply outlining the surfaces of people or objects, the 4D solid volume model describes the voxel occupancy for the space. Stated another way, the 4D solid volume model can describe the internal fillings of the entire space. With a 4D solid volume model, potentially every detail about people and their environment can be captured, even in a large-scale, cluttered scene. This rich 4D detail can be used to reliably track the actions of people and/or objects in real-world settings and build an understanding of their behaviors and interactions.

The uses for such a robust understanding of people's actions and behaviors are practically limitless. Workplaces could improve efficiency and/or comfort by optimizing the movement patterns of workers. Stores could improve product placement by better understanding the interaction of shoppers with products. Factories could improve safety by limiting the proximity of humans to potentially dangerous movements of large, industrial robots. Traffic accidents could be avoided by monitoring the flow of cars and/or pedestrians on a city street. Even our own homes could be equipped to respond to our activities by anticipating needs for lighting, temperature, music, letting a pet in or out, adding items to a grocery list, etc. As such, 4D dynamic solid modeling concepts can be an integral part of smart homes, smart stores, smart factories—a smarter world.

Example Techniques

Figure 7:
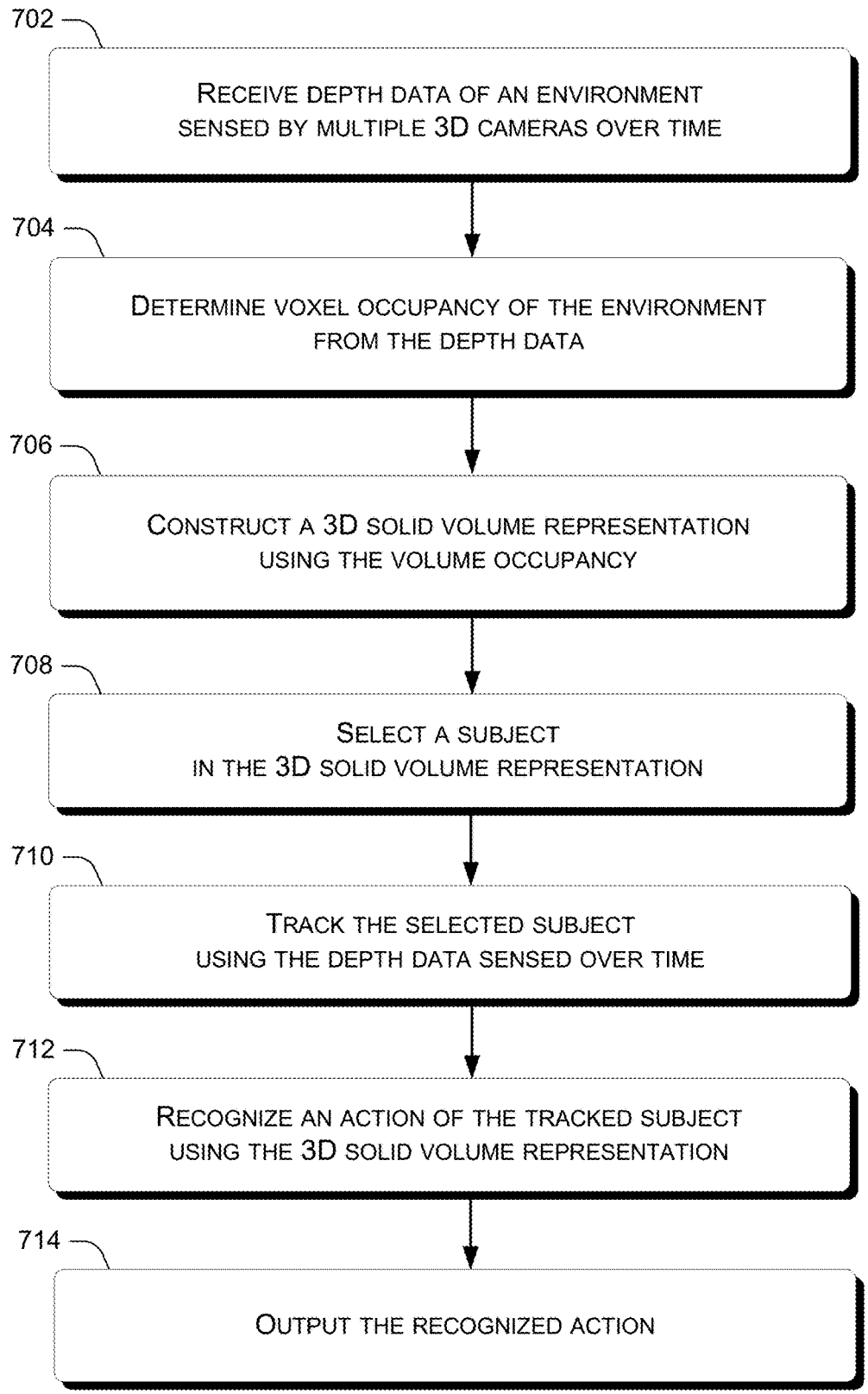
Figure 8:
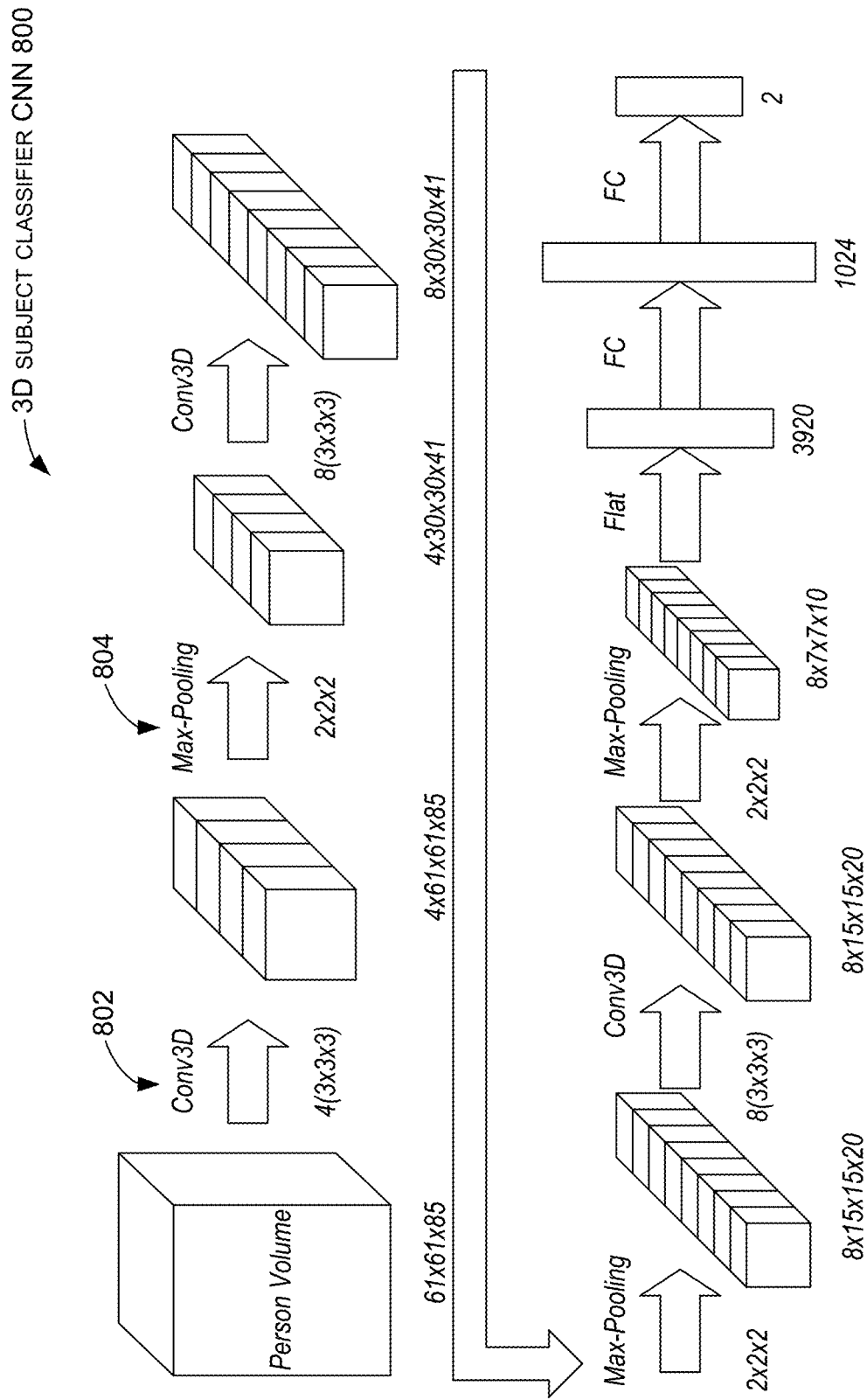
Figure 9:
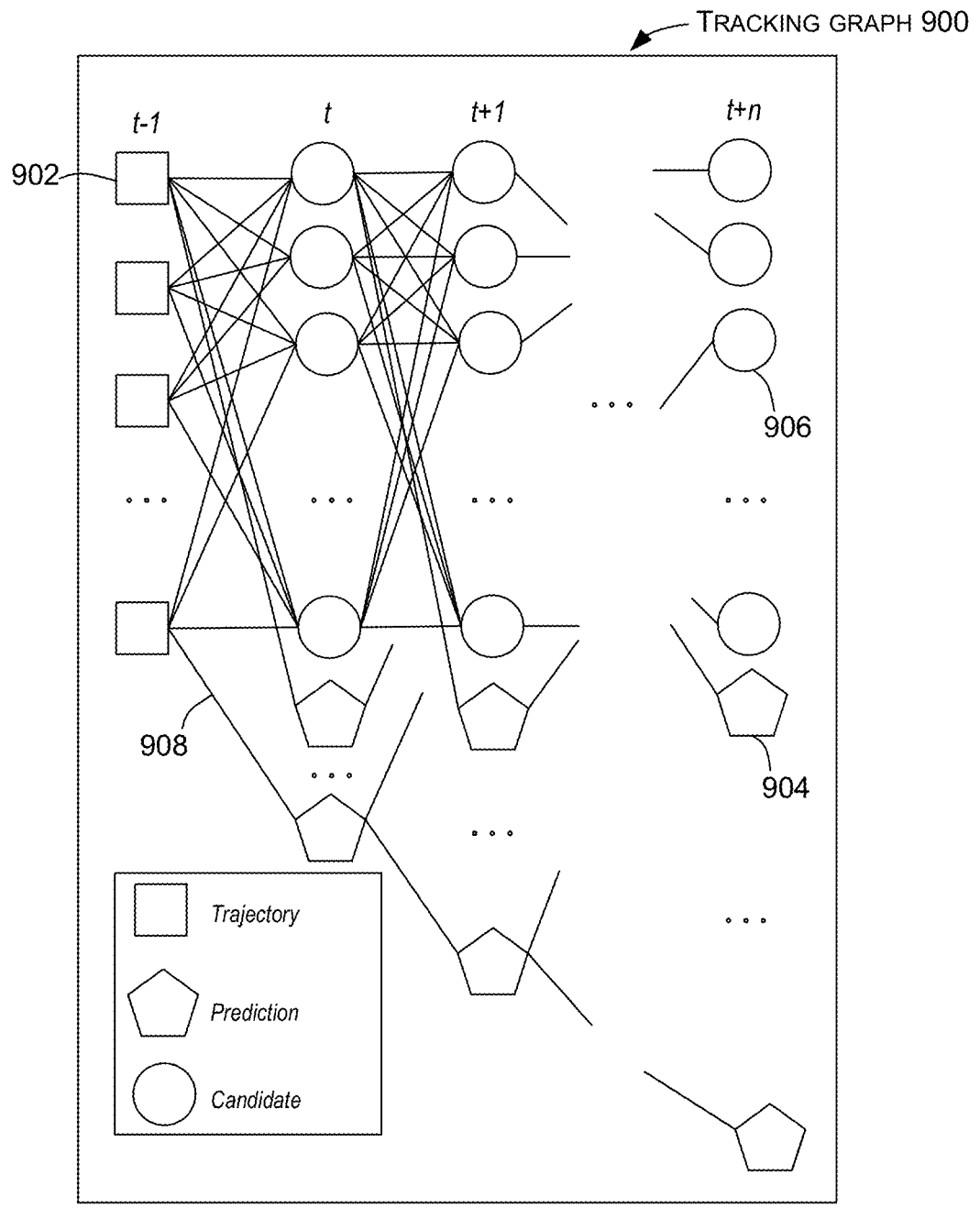
Figure 10:
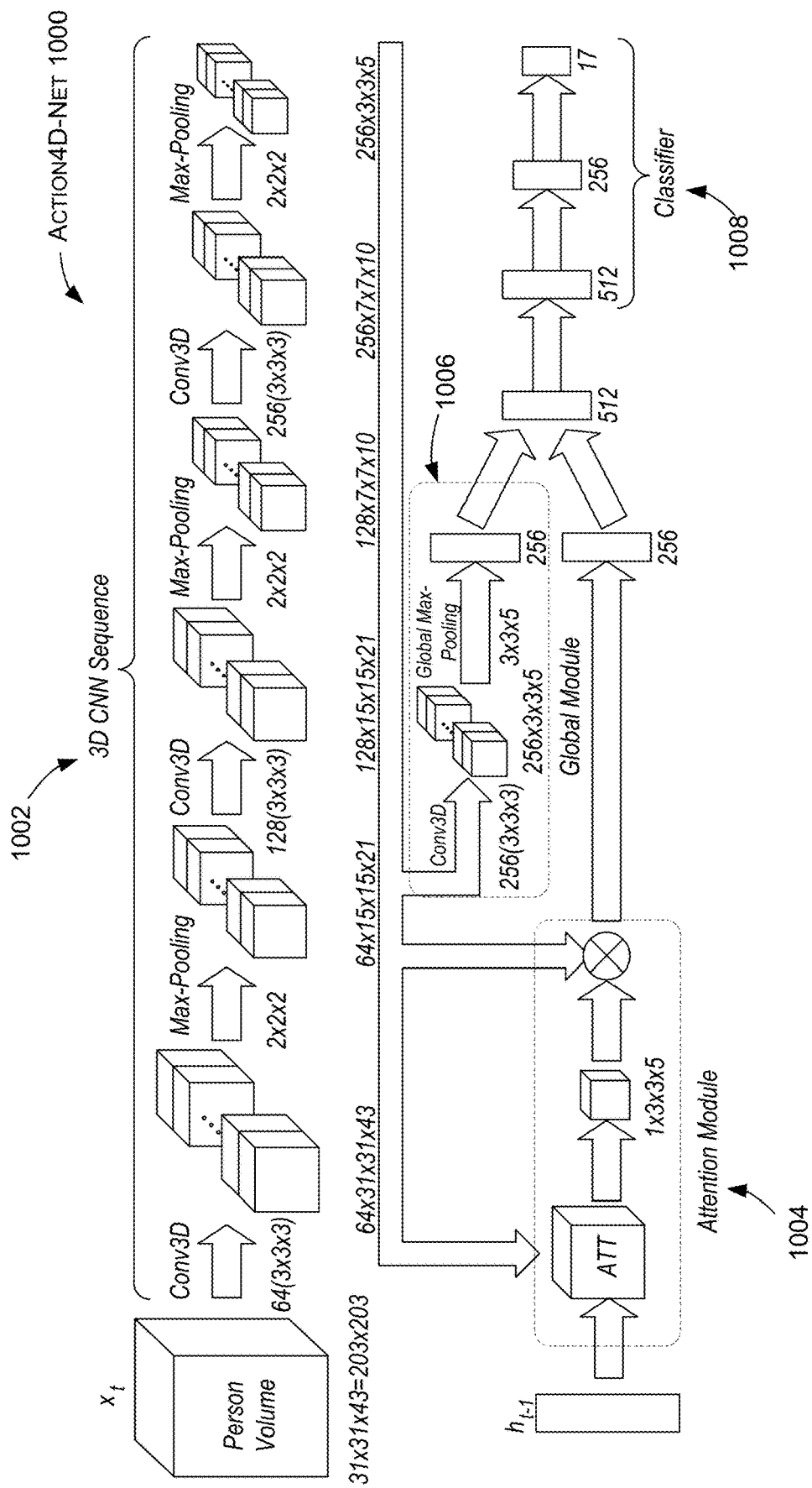

FIGS. 7-10 illustrate example techniques (e.g., methods) for performing 4D dynamic solid modeling concepts. FIG. 7 can include example technique 700. In FIG. 7, blocks 702-714 outline the steps of technique 700, which are described in detail below. FIG. 8 provides additional detail regarding block 708. FIG. 9 provides additional detail regarding block 710. FIG. 10 provides additional detail regarding block 712.

In some implementations, aspects of the example techniques described relative to FIGS. 7-10 can be similar to aspects of the 4D dynamic solid modeling scenario 100 described above relative to FIGS. 1A through 6. As such, occasional reference will be made to previous FIGS. to assist the understanding of the reader.

As shown in FIG. 7, at block 702, technique 700 can receive depth data of an environment sensed by multiple 3D cameras over time. The cameras can be similar to cameras 120 shown in the example in FIG. 1A. In one implementation, the cameras can be Kinect™ brand cameras from Microsoft Corporation.

At block 704, technique 700 can determine voxel occupancy of the environment from the depth data. At block 706, technique 700 can construct a 3D solid volume representation using the voxel occupancy. In some implementations, a 3D solid volume construction algorithm can perform blocks 704 and/or 706 of technique 700.

Referring to block 704, determining voxel occupancy can include partitioning the environment into voxels. Potentially any environment can be partitioned into voxels. Furthermore, the environment can be mapped using a world coordinate system, such as the x (horizontal), y (horizontal), and/or z (vertical) coordinates shown in the example in FIG. 2A, for example. The cameras and/or depth data can be calibrated with respect to the world coordinate system. Once the environment is mapped, each voxel can be located by its respective coordinates. Voxel occupancy can be determined based on whether each of the located voxels contains part of a subject (e.g., person and/or object).

In some cases, the environment can be partitioned into voxels with a cube shape. For instance, a voxel can have a cube shape measuring 25 millimeters per side. In another instance, a voxel can measure 5 centimeters per side. Other sizes, shapes, methods for partitioning an environment, and/or methods for mapping voxels in an environment are contemplated.

In one implementation, given a set of calibrated RGBD images, voxel center coordinates can be denoted as $(x_i, y_i, z_i)$, where $i=1 \ldots N$. A number of cameras can be M. Extrinsic matrices of the cameras can be $[R_j|t_j]$, where $j=1 \ldots M$, $R_j$ is a rotation matrix, $t_j$ is a translation vector, and the intrinsic matrices are $K_j$. The depth images from the cameras can be denoted as $D_1, \ldots, D_M$. In the following, 0 and 1 can represent false (e.g., an unoccupied voxel) and true (e.g., an occupied voxel), respectively. The occupancy of the voxel at $(x_i, y_i, z_i)$ from camera j can be computed as:

$$O_j(i)=[R_j^3|t_j^3][x_i,y_i,z_i,1]^T \geq D_j(K_j[R_j|t_j][x_i,y_i,z_i,1]^T)$$

where $R_j^3$ and $t_j^3$ are the third row of $R_j$ and $t_j$. $O_j(i)$ can also be conditioned on the camera field of view. For example, if the projection $K_j[R_j|t_j][x_i, y_i, z_i, 1]^T$ is outside of the field of view, $O_j(i)$ can be set to 1. Thus, the occupancy O(i) of the voxel i can be the intersection of $O_j(i)$ from all the M cameras:

$$O(i)=\cap_{j=1}^{M}\{O_j(i)\}$$

Referring to block 706, a 3D solid volume representation of the environment can be constructed using the volume occupancy. In some cases, only the volume seen from a particular camera is carved out. This aspect can allow construction of a 3D solid volume representation even where the fields of view of different depth cameras do not have overlap.

In some implementations, the following two techniques can further improve quality of 3D solid volume representation: 1) an orthographic top-down view of the point cloud in the volume can be used as a mask to remove small "tails" introduced at camera boundary regions; and 2) small misses in synchronization among cameras can be mitigated. In some cases, poor synchronization among cameras can lead to vanishing of thin structures in 4D volumes. A best-effort fashion can include extracting frames from all the cameras linked together into a local network. For example, with fast moving body parts (e.g., arms), small misses in synchronization may occur. To remedy this issue, all the points from the depth cameras can be injected into the solid volume. For example, O(i) can be set to one where there is a point in the voxel i. These voxels can be on the scene surface and the other voxels can be internal voxels. In this example, the holistic property of the 4D volume can produce reliable action recognition.

In some cases, directly computing 4D solid volumes using a CPU can be resource prohibitive due to the large number of voxels. For example, the example environment 102 described relative to FIG. 1A above can have a volume of 201×201×85 voxels. Alternatively, pre-computation can be performed for $[R_j^3|t_j^3][x_i, y_i, z_i, 1]^T$ and $K_j[R_j|t_j][x_i, y_i, z_i, 1]^T$. Then comparison operations can be performed in parallel in a GPU. Similarly, point cloud filling and top-down carving can also be performed in parallel. In this example, real-time 4D solid volume modeling of environment 102 can be performed with as little as 1 to 2 percent of GPU usage.

At block 708, technique 700 can select a subject in the 3D solid volume representation. As described above, the subject can be a person and/or object to be tracked in a scene. In some cases, 4D dynamic solid modeling can include scanning cluttered, crowded, and/or fast-moving scenes. In conditions such as these, direct action recognition can be difficult, with potential for inaccurate results and/or intense computing resource requirements. Computing resources can be conserved and results can be improved by focusing attention on selected subjects.

To select a subject using the 3D solid volume representation, as a first step, subject candidates can be detected. For example, a subject candidate detection algorithm can be employed. Although a sweeping volume solution could be used to detect subject candidates, this approach can have high complexity. Alternatively, a light-weight solution can be used. In some cases, a top-down envelope image can be processed to detect subject candidates. For example, f(m,n,k) can be the volume data. In this example, m,n can be x,y coordinates, and k can be the z coordinate. Here, z=0 can be the ground plane. The top-down envelope can be g(m,n)=$\max_k(\phi(f(m,n,k)))$, where $\phi(f(m,n,k))$=k if f(m,n,k)>0 and otherwise $\phi(f(m,n,k))$=0. In some cases, each potential subject can correspond to at least one local maximum on g. In this example, a simple Gaussian filter can be used to extract the subject candidates. In this example, a subject candidate can be detected by locating a local maximum with a given width and height. The local maxima can be found on the Gaussian-filtered, top-down envelope using non-maximum suppression. In other implementations, additional voxel attributes, such as color and/or multi-resolution volume data, can be used to assist in detecting subject candidates.

Once subject candidates are detected, a partial volume (similar to the partial volumes 202 introduced above relative to FIG. 2B) can be established around each subject candidate. For example, the subject candidate detection algorithm can also establish a corresponding partial volume for each subject candidate. In some cases the partial volumes can be cuboids. In some cases a height of the partial volumes can be the overall height of the mapped environment. In this example depicted in FIG. 2B, a partial volume can have a volume of 31×31×43 voxels, where the voxels measure 5 centimeters per side. This example volume can be large enough to cover a person with different poses. Other sizes and/or shapes of partial volumes are contemplated.

A subject classifier algorithm can be used to classify whether each partial volume contains a subject. In some implementations, machine learning with a trained model can be used for classification. For example, a 3D subject classifier convolutional neural network (CNN) can be used for classification. For instance, a 3D people classifier CNN trained on labeled training data with people can be used to classify whether a partial volume contains a person. In other cases, other models could be used to classify whether partial volumes contain other subjects of interest, such as pets, robots, cars, etc.

The structure of an example 3D subject classifier CNN 800 is shown in FIG. 8. The 3D subject classifier CNN 800 can contain a sequence of 3D convolution layers 802, rectified linear units (ReLUs), and pooling layers 804 (e.g., max-pooling layers) to extract features from the partial volume. In FIG. 8, to avoid clutter on the drawing page, only one instance of a 3D convolution layer 802 and a pooling layer 804 are designated, and the ReLUs are not shown. The features are then fed into a fully connected network for people classification. The 3D subject classifier CNN 800 can give a probability of each partial volume containing a subject. In some cases, tracking partial volumes over time can remove false subject detections and/or smooth out missing subject detections, therefore improving the detection accuracy. Even with just a few thousand frames of training data, in some cases the 3D subject classifier CNN 800 can achieve relatively high people classification accuracy for the purposes of 4D dynamic solid modeling. The results from 3D subject classifier CNN 800 can be used to select subjects to be tracked in the next step of technique 700.

Referring again to FIG. 7, at block 710, technique 700 can track the selected subjects using the depth data sensed over time with a subject tracking algorithm. In some cases, a subject tracking algorithm can be represented by the example tracking graph 900 shown in FIG. 9. In this example, subject tracking can be formulated as a path following problem. For instance, subject tracking can include construction of a trajectory for a selected subject in a current frame t and the next n frames over time. In one example, n can be a small number, e.g., three. A small number of frames can introduce a short delay, which can improve reliability of subject tracking.

As shown in FIG. 9, tracking graph 900 can include three kinds of nodes: trajectory nodes 902 (rectangle shape) represent trajectories already formed, prediction nodes 904 (pentagon shape), candidate nodes 906 (circle shape), and edges 908. Only one of each type of element is labeled in FIG. 9 to avoid clutter on the drawing page. The number of prediction nodes 904 can equal the number of candidate nodes 906 plus the number of prediction nodes 904 at a previous time point. The edges 908 in the graph can indicate possible matches between nodes. Edge weights can be determined by a difference in probabilities between the 3D subject classifier CNN 800, a Euclidean distance, a voxel occupancy volume difference, and/or a color histogram difference between neighboring nodes. The trajectory nodes 902 can also have a weight inversely proportional to a trajectory length. In some cases, the subject tracking algorithm can include finding an extension of each trajectory from time t−1 to t+n, so that the paths pass each trajectory node 902 and all the paths are node disjoint.

In some cases, the subject tracking algorithm can be reduced to a min-cost flow problem and solved using a polynomial algorithm. For instance, when tracking a person, each trajectory can be extended to the neighboring nodes within a radius $d_L$, which can be determined by the max-speed of a person and the frame rate of the subject tracking algorithm. A gating constraint can also speed up the (potentially optimal) path search.

In this example subject tracking algorithm, after the path search, each existing trajectory can be extended by one-unit length. In a person tracking instance, the trajectories with a low people score can be removed. Here, the people score can be defined as the weighted sum of a current people probability and a previous people score. Also, new trajectories can be included for each candidate node at time t that is not on any path. The new trajectories can be used to form a new graph for the next time instant. The procedure can be repeated for each new video frame received.

In some cases, FIGS. 4A through 4C can be viewed as an example result of the subject tracking algorithm. FIGS. 4A through 4C can represent 4D tracking over a few thousand image frames, for example. The subject tracking algorithm can be robust against clutter and crowd. For instance, the subject tracking algorithm can perform in relatively complex interaction cases, such as two people hugging, without tracking loss.

Referring again to FIG. 7, at block 712, technique 700 can recognize an action of the tracked subject using the 3D solid volume representation. For example, an action recognition procedure can include analyzing how the 3D solid volume representation of a person (e.g., a person volume) evolves over time to determine a recognized action of the person (see for example FIG. 5, above). Since the present 4D dynamic solid modeling concepts include determining voxel occupancy for potentially the entire environment, the 3D solid volume representation within any given partial volume can include rich contextual information. This contextual information can be valuable background context for recognizing an action. For instance, a chair underneath a person can be used to infer that the person is sitting. In some cases, body poses, movement of body parts, and/or objects a person is handling can be viewed as clues to infer the action of a person. In other implementations, the position and/or speed of a subject could also be used in action recognition.

In some cases, an action recognition algorithm can include use of a trained model to recognize actions. In one implementation, the trained model can be a deep convolutional neural network. For example, FIG. 10 illustrates an example model architecture, termed Action4D-Net 1000. Inputs to Action4D-Net 1000 can be a sequence of partial volumes automatically extracted from the subject selection and subject tracking procedures described above relative to blocks 708 and 710 of FIG. 7.

As shown in FIG. 10, in Action4D-Net 1000, inputs can go through a 3D CNN sequence 1002. The 3D CNN sequence 1002 can include several 3D convolution layers followed by 3D max-pooling layers which can produce action features. In some implementations, an auxiliary attention module 1004 can be used to generate local features. Also, a global module 1006 with global max-pooling can be used to generate global features. Both the local and the global features for each time instant can be concatenated. In this example, the concatenated features can be inputs into a classifier, such as a Recurrent Neural Network (RNN) 1008. RNN 1008 can be a Long Short-Term Memory (LSTM) cell, for instance. The RNN 1008 can be used to aggregate temporal information for a final action classification.

The auxiliary attention module 1004 can improve performance of action recognition by mimicking the ability of humans to focus attention on different regions when recognizing different actions. For instance, when recognizing the action of book reading, humans generally focus on hands of a subject and the book in his/her hands. While recognizing the action of drinking water, humans shift focus to the mouth area of the subject. The auxiliary attention module 1004 is used to mimic this attention focus. In particular, the auxiliary attention module 1004 is able to automatically discover relevance between different inputs at a given context. The auxiliary attention module 1004 can be employed to automatically learn the (potentially) most relevant local sub-volumes for a given action.

For example, $V \in \mathbb{R}^{F \times L \times W \times H}$ can be the output from the last 3D convolution layer, where F is the number of filters and L, W, and H are the size of the 3D output. In particular, each location in the 3D output can be represented as $v_{ijk} \in \mathbb{R}^F$ for $1 \le i \le L$, $1 \le j \le W$ and $1 \le k \le H$. The attention weights for all $v_{ijk}$ can be computed as:

$$\beta_{ijk} = h_{t-1}^T U v_{ijk}$$

$$\alpha = \text{softmax}(\beta)$$

where $\alpha \in \mathbb{R}^{L \times W \times H}$ can be the attention weights, $U \in \mathbb{R}^{D \times F}$ can be the weight matrix to be learned, and $h_{t-1} \in \mathbb{R}^D$ can be the previous hidden state of size D from the RNN. Here, the network can automatically discover relevance of different sub-volumes for different actions. Next, the local feature v can be computed as a weighted sum of all the sub-volume features $v_{ijk}$.

$$v = \sum_{i,j,k} a_{ijk} v_{ijk}$$

At global module 1006, global max-pooling can be employed to extract global features as extra information for action recognition. For instance, 3D solid volume representations of people sitting vs. kicking can look quite different. These different actions can be captured by the global features of the partial volumes. A 3D convolution layer can be used, followed by a global pooling layer, to obtain the global feature g. Subsequently, the global feature g and the local attention feature v can be supplied to the LSTM cell to capture temporal dependencies. An action classification model, which can be a Multi-Layer Perceptron (MLP), for example, can take a hidden state from the LSTM cell as input to generate recognized actions.

Referring again to FIG. 7, at block 714, technique 700 can output the recognized action. The recognized action can be used in a variety of scenarios, some of which have been suggested earlier. The recognized actions can be combined to consider interactions of people and/or objects. The recognized actions can be analyzed to understand behaviors of people and/or objects over time.

The described methods can be performed by the systems and/or elements described above and/or below, and/or by other 4D dynamic solid modeling devices and/or systems.

The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on one or more computer-readable storage medium/media as a set of instructions (e.g., computer-readable instructions or computer-executable instructions) such that execution by a processor of a computing device causes the computing device to perform the method.

Example Results

Table 1, provided below, shows results of the present 4D dynamic solid modeling concepts compared to the existing computer vision methods. In order to introduce the results shown in Table 1, following are brief descriptions of the technical problem of action recognition by computer vision, and the existing computer vision approaches to solving this technical problem.

In general, human vision is good at recognizing subtle actions. Computer vision can have difficulty recognizing and categorizing actions with the robustness and accuracy of human vision. The difficulty can be caused by the variations of the visual inputs, such as a crowded and cluttered environment. For example, in a video of an environment, people may have different clothing, different body shapes, and/or may perform the same action in slightly different ways. The environment captured in the video may be crowded with other people or objects that create occlusions, in other words partially blocking a view of a person performing an action. A crowded or cluttered environment can also make it difficult to segment out (e.g., distinguish) a person from other people or objects. In another example, a viewing angle of a video camera may be different from a viewing angle of a training video with which a computer vision method is trained. In this example, due to the different viewing angle, an action in the video may look quite different from the same action shown in the training video, and computer vision may have trouble recognizing the action.

With existing computer vision approaches, the data collection and/or processing requirements to produce reliable results can be onerous. For example, successful action recognition can require deep learning methods based on multiple data streams, such as color, motion, body part heat maps, and/or finding actions in spatial-temporal 3D volumes. In other cases, in order to produce reliable results, training data are required to include a wide variation of camera settings, people's clothing, object appearances, and backgrounds. Other approaches require special hardware for high quality stereo imaging, and/or complex equipment calibration methods for precise point alignment. Still other approaches require special blue/green or static backgrounds to be able to single out people and determine their actions, making these approaches impractical in the real world. Some approaches include semantic segmentation to differentiate a person from a background before trying to recognize an action of the person. However, semantic segmentation may lose body parts or include other background objects. For this reason, semantic segmentation errors can cause action recognition failures. Many methods are camera view dependent—if the view of the camera is different from the trained model, the model must be retrained before actions can be recognized.

The results shown in Table 1 were produced with an experimental setup intended to approximate a real-world environment, without relying on the impractical requirements described above. The experimental setup included a cluttered scene with multiple people. The scene included various objects such as a sofa, tables, chairs, boxes, drawers, cups, and books. The people had different body shapes, gender, and heights. The dataset included the people performing 16 actions, such as drinking, clapping, reading a book, calling, playing with a phone, bending, squatting, waving hands, sitting, pointing, lifting, opening a drawer, pull/pushing, eating, yawning, and kicking. As indicated in Table 1, the experiment was performed with people in five groupings.

In the experimental setup, four RGBD cameras were used to capture videos of the environment. Some of the videos were used to train models, and some of the videos were used for testing. Each tracked person in each video frame was assigned an action label. During the experiment, an action classification was determined to be correct where the predicted action label for a particular person in each video frame matched the assigned action label. The match was accepted within a window of plus/minus three successive video frames relative to the particular video frame.

The existing computer vision approaches tested included ShapeContext, Moments, Color+Depth, Skeleton, and PointNet. Each of these existing computer vision approaches are briefly introduced below.

ShapeContext, or 3D Shape context, is a 3D version of a shape context descriptor, where the context of a shape is used to model whole body configuration in an effort to better recognize actions of the body. In general, hand-crafted features such as shape context can be less robust than learned features from deep learning, especially when there is strong background clutter. In this experiment, ShapeContext had the height axis and the angle axis uniformly partitioned, and the radial axis logarithmically partitioned. ShapeContext can have different number of bins (e.g., 512 bins). For ShapeContext, a deep network was used in which the input was the 3D shape context descriptors. The deep network used a Long Short-Term Memory (LSTM) network to aggregate temporal information.

Moment is another example of a shape descriptor, and another example of a hand-crafted feature that can be less robust than learned features, especially when there is strong background clutter. In this experiment, raw moments up to order 4 were used. Each element of a moment vector was computed as $\Sigma_{x,y,z}(x-x_C)^p(y-y_C)^q(z-z_C)^r$, where (x,y,z) were the coordinates of the occupied voxels and $(x_c, y_c, z_c)$ was the volume center. Similar to the above ShapeContext approach, the moment descriptor was fed into a CNN for action recognition.

Relating to Skeleton, images are analyzed to model people with 3D stick figures (e.g., skeletons) so that poses may be identified. However, extracting the 3D stick figures is non-trivial, and can fail in a cluttered environment due to occlusions. Moreover, the 3D stick figures do not include the context of actions, such as an object that a human subject is handling. It is therefore hard to disambiguate many different actions using the 3D stick figures alone. Also, this method is camera view dependent for successful action recognition. In this experiment, positions of the skeleton joints of each subject were normalized using the neck point and then the x-y coordinates from all four cameras were concatenated into a feature vector. A deep network was trained using a similar approach to the above ShapeContext method.

A color plus depth approach can be used as another method. This method follows the scheme of standard action recognition methods on 2D images, and is also camera view dependent. In this experiment, bounding boxes of each person were found based on tracking result. Color and depth images of each person in the video were cropped. The cropped color and depth video was used in action recognition. A deep neural network was trained using the cropped color and depth images and corresponding action labels.

PointNet is a deep learning method for object recognition and semantic segmentation on 3D point clouds. In this experiment, the model was extended to include an LSTM layer to handle sequential data for action recognition. The network was trained end-to-end using point clouds from the four camera images.

In Table 1 below, percentage accuracy among the competing methods are shown for each of the five groupings in the experiment. As seen in Table 1, 4D dynamic solid modeling concepts (4D DSM) generally produced the highest action recognition accuracy results among the competing methods. For example, for Group 1, 4D dynamic solid modeling was 83.6 percent accurate, while the next best performing method, PointNet, was only 55.8 percent accurate. Other implementations of 4D dynamic modeling and/or different comparisons may produce slightly different results, but 4D dynamic modeling can produce significantly better results than existing methods.

TABLE 1

Action recognition accuracy (percentage).

| Method | Group 1 | Group 2 | Group 3 | Group 4 | Group 5 |
| --- | --- | --- | --- | --- | --- |
| ShapeContext | 36.2 | 28.3 | 35.3 | 63 | 39.1 |
| Moments | 41.2 | 44 | 46.6 | 48.2 | 44.5 |
| Skeleton | 52.7 | 51.2 | 56.6 | 56.1 | 58.1 |
| Color + Depth | 48.2 | 55.4 | 63.7 | 70.9 | 56.6 |
| PointNet | 55.8 | 60.4 | 62 | 57 | 53.7 |
| 4D DSM | 83.6 | 83.8 | 92.6 | 96.6 | 88.3 |

Table 1 shows how 4D dynamic solid modeling concepts can be an accurate and reliable technical solution to the technical problem of action recognition in a real-world, cluttered environment. 4D dynamic solid modeling can be invariant to camera view angles, resistant to clutter, and able to handle crowds. 4D dynamic solid modeling provides information not only about people, but also about the objects with which people are interacting. Therefore, rather than being hindered by clutter, 4D dynamic solid modeling is able to provide rich, 4D information about the complex environment.

The 4D dynamic solid modeling technical solution is able to provide rich, 4D information in real time without onerous equipment or processing resource requirements. In some cases, 4D dynamic solid modeling of an environment can be performed while using as little as 1 to 2 percent of a generic GPU. Additionally, 4D dynamic solid modeling techniques can be fast. For example, with a single GTX1080 TI, 4D dynamic solid modeling can track 10 people and infer their actions at 15 frames per second.

Stated another way, 4D dynamic solid modeling can quickly and reliably generate rich, 4D information of a complex environment, and recognize actions of tracked subjects in real time. Experimental results confirm that 4D dynamic solid modeling offers improved action recognition performance among existing computer vision methods. Even in large-scale settings, 4D dynamic solid modeling can be deployed to enhance how people interact with the environment.

Example System

Figure 11:
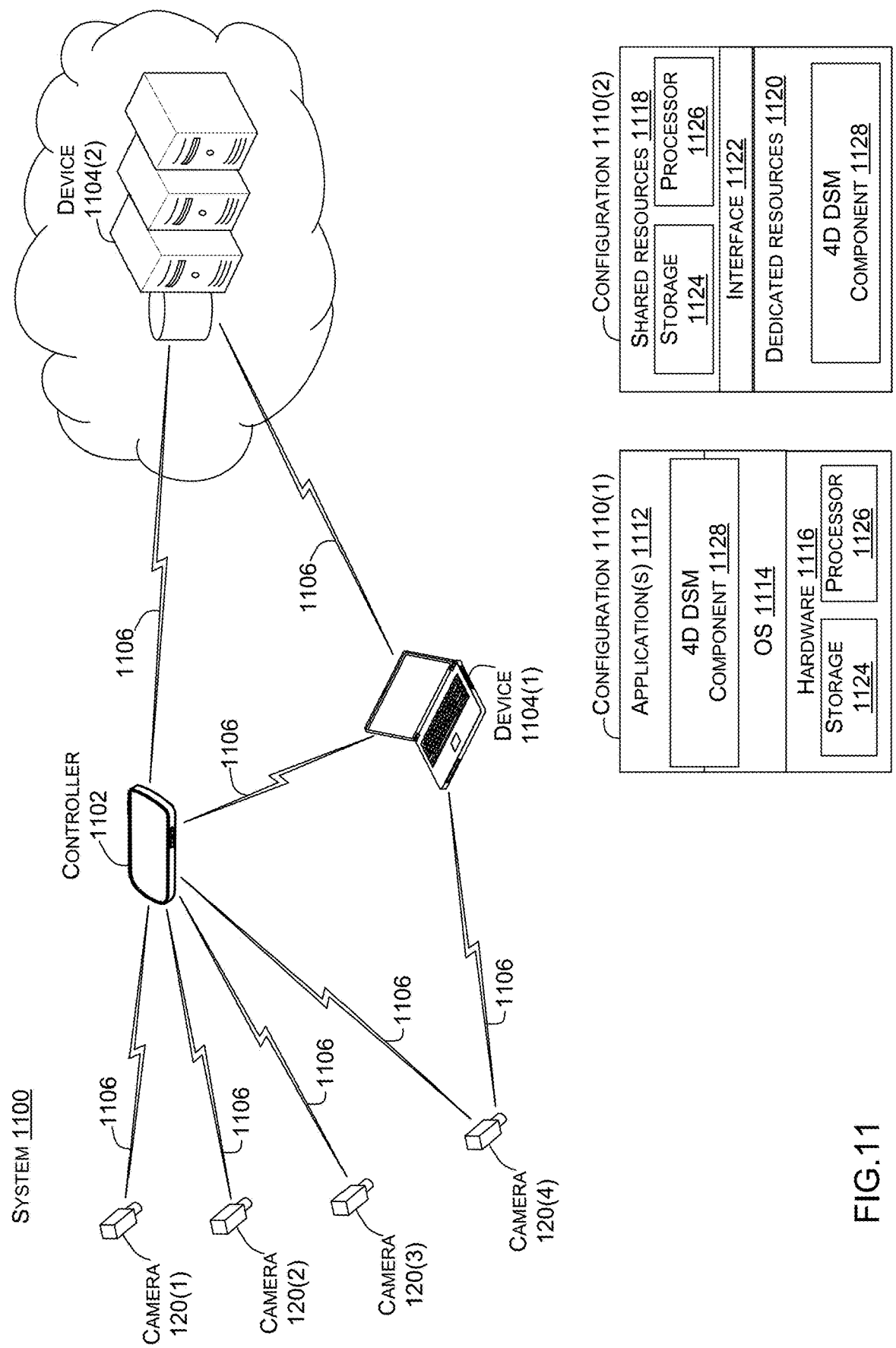
FIG. 11 shows an example 4D dynamic solid modeling system in accordance with some implementations of the present concepts.

FIG. 11 shows a system 1100 that can accomplish 4D dynamic solid modeling concepts. For purposes of explanation, system 1100 includes cameras 120. System 1100 also includes a controller 1102. The controller 1102 can coordinate function of and/or receive data from the cameras 120 and/or from other sensors. System 1100 can also include one or more devices 1104. In the illustrated example, device 1104(1) is manifest as a notebook computer device and example device 1104(2) is manifest as a server device. In this case, the controller 1102 is freestanding. In other implementations, the controller 1102 can be incorporated into device 1104(1). The cameras 120, controller 1102, and/or devices 1104 can communicate via one or more networks (represented by lightning bolts 1106) and/or can access the Internet over the networks. Various networks are shown in FIG. 11, additional networks are contemplated. For example, in some cases cameras 120 could communicate with device 1104(2).

As illustrated relative to FIGS. 1A-1E, the cameras 120 can be proximate to an environment to which 4D dynamic solid modeling concepts are applied. Controller 1102 and/or devices 1104 can be proximate to the environment or remotely located. For instance, in one configuration, device 1104(1) could be located proximate to the environment (e.g., in the same building), while device 1104(2) is remote, such as in a server farm (e.g., cloud-based resource).

FIG. 11 shows two device configurations 1110 that can be employed by devices 1104. Individual devices 1104 can employ either of configurations 1110(1) or 1110(2), or an alternate configuration. (Due to space constraints on the drawing page, one instance of each configuration is illustrated rather than illustrating the device configurations relative to each device 1104). Briefly, device configuration 1110(1) represents an operating system (OS) centric configuration. Configuration 1110(2) represents a system on a chip (SOC) configuration. Configuration 1110(1) is organized into one or more applications 1112, operating system 1114, and hardware 1116. Configuration 1110(2) is organized into shared resources 1118, dedicated resources 1120, and an interface 1122 there between.

In either configuration 1110, the device can include storage/memory 1124, a processor 1126, and/or a 4D dynamic solid modeling (4D DSM) component 1128. In some implementations, the 4D dynamic solid modeling component 1128 can include a 3D solid volume construction algorithm, a subject candidate detection algorithm, a subject classifier algorithm, a subject tracking algorithm, and/or an action recognition algorithm. The 3D solid volume construction algorithm can determine voxel occupancy and/or construct a 3D solid volume representation of the environment. The subject candidate detection algorithm can find subject candidates and/or determine partial volumes within the 3D solid volume representation. The subject classifier algorithm can classify whether the partial volumes contain a subject of interest. The tracking algorithm can track subjects of interest using 4D data. The action recognition algorithm can recognize actions, interactions, and/or behaviors of the tracked subjects.

In some configurations, each of devices 1104 can have an instance of the 4D dynamic solid modeling component 1128. However, the functionalities that can be performed by 4D dynamic solid modeling component 1128 may be the same or they may be different from one another. For instance, in some cases, each device's 4D dynamic solid modeling component 1128 can be robust and provide all the functionality described above and below (e.g., a device-centric implementation). In other cases, some devices can employ a less robust instance of the 4D dynamic solid modeling component 1128 that relies on some functionality to be performed remotely. For instance, device 1104(2) may have more processing resources than device 1104(1). In such a configuration, depth data from cameras 120 may be sent to device 1104(2). This device can use the depth data to train one or more of the algorithms introduced above. The algorithms can be communicated to device 1104(1) for use by 4D dynamic solid modeling component 1128(1). Then 4D dynamic solid modeling component 1128(1) can operate the algorithms in real time on data from cameras 120 to recognize an action of a person. In another case, the subject tracking algorithm can be accomplished by 4D dynamic solid modeling component 1128(1) on device 1104(1), while the action recognition algorithm can be accomplished by 4D dynamic solid modeling component 1128(2) on device 1104(2), for example.

The term "device", "computer", or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices". Examples of computer-readable storage devices include volatile storage media, such as RAM, and non-volatile storage media, such as hard drives, optical discs, and flash memory, among others.

Examples of devices 1104 can include traditional computing devices, such as personal computers, desktop computers, servers, notebook computers, cell phones, smart phones, personal digital assistants, pad type computers, mobile computers, appliances, smart devices, IoT devices, etc. and/or any of a myriad of ever-evolving or yet to be developed types of computing devices.

As mentioned above, configuration 1110(2) can be thought of as a system on a chip (SOC) type design. In such a case, functionality provided by the device can be integrated on a single SOC or multiple coupled SOCs. One or more processors 1126 can be configured to coordinate with shared resources 1118, such as memory/storage 1124, etc., and/or one or more dedicated resources 1120, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Additional Examples

Various device examples are described above. Additional examples are described below. One example includes a system comprising multiple 3D cameras positioned relative to an environment to sense the environment from different viewpoints. The system also comprises a processing device and a storage device storing computer-executable instructions which, when executed by the processing device, cause the processing device to receive depth data sensed by the multiple 3D cameras over time, determine voxel occupancy of the environment from the depth data, construct a 3D solid volume representation using the voxel occupancy, select a subject in the 3D solid volume representation, track the selected subject using the depth data over time, recognize an action of the tracked subject using the 3D solid volume representation, and output the recognized action.

Another example can include any of the above and/or below examples where the computer-executable instructions further cause the processing device to partition the environment into voxels.

Another example can include any of the above and/or below examples where the computer-executable instructions further cause the processing device to determine the voxel occupancy by determining whether individual voxels are occupied.

Another example can include any of the above and/or below examples where the computer-executable instructions further cause the processing device to detect a subject candidate by locating a local maximum in the 3D solid volume representation.

Another example can include any of the above and/or below examples where the computer-executable instructions further cause the processing device to establish a partial volume around the subject candidate.

Another example can include any of the above and/or below examples where the computer-executable instructions further cause the processing device to select the subject by using a trained model to classify the partial volume as containing the subject.

Another example can include any of the above and/or below examples where the computer-executable instructions further cause the processing device to recognize the action by applying a trained model to the 3D solid volume representation.

Another example can include any of the above and/or below examples where the computer-executable instructions further cause the processing device to recognize the action by aggregating the depth data sensed over time.

Another example includes a system comprising multiple 3D cameras positioned relative to an environment to sense depth data of the environment from different viewpoints over time. The system also comprises a processor configured to process the depth data to construct 3D solid volume representations of the environment, select subjects from the 3D solid volume representations, and recognize actions of the selected subjects.

Another example can include any of the above and/or below examples where the processor is further configured to recognize an interaction between first and second individual selected subjects in the environment.

Another example can include any of the above and/or below examples where the processor is further configured to determine partial volumes of the 3D solid volume representations, where an individual partial volume corresponds to an individual selected subject.

Another example can include any of the above and/or below examples where the processor is further configured to recognize an interaction between first and second individual selected subjects, where a first individual partial volume of the first individual selected subject overlaps a second individual partial volume of the second individual selected subject.

Another example can include any of the above and/or below examples where at least a portion of the first individual selected subject occupies voxels in the second individual partial volume.

Another example can include any of the above and/or below examples where the individual selected subject is a person, and the processor is further configured to recognize an interaction between the person and an object.

Another example can include any of the above and/or below examples where at least a portion of the object occupies voxels within the individual partial volume.

Another example includes a method comprising receiving 4D data sensed by multiple 3D cameras in an environment, constructing 3D solid volume representations of the environment using the 4D data, and recognizing actions of subjects in the 3D solid volume representations using the 4D data.

Another example can include any of the above and/or below examples where an individual 3D solid volume representation describes voxel occupancy of the environment at a particular time point.

Another example can include any of the above and/or below examples where the method further comprises recognizing the actions of the subjects using models trained on labeled 3D solid volume representations.

Another example can include any of the above and/or below examples where the method further comprises recognizing the actions of the subjects by analyzing partial volumes of the 3D solid volume representations.

Another example can include any of the above and/or below examples where the method further comprises calibrating the 4D data sensed by the multiple 3D cameras in the environment to build an individual 3D solid volume representation using depth data from the multiple 3D cameras.

Conclusion

Although the subject matter relating to 4D dynamic solid modeling has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system, comprising:
multiple 3D cameras positioned relative to an environment to sense the environment from different viewpoints;
a processing device; and
a storage device storing computer-executable instructions which, when executed by the processing device, cause the processing device to:
receive depth data sensed by the multiple 3D cameras over time,
determine voxel occupancy of the environment from the depth data,
construct a 3D solid volume representation using the voxel occupancy,
detect at least two different subjects in the 3D solid volume representation,
establish at least two partial volumes around the at least two different subjects, including a first partial volume that includes a first subject and a second partial volume that overlaps the first partial volume and includes a second subject,
track the at least two different subjects over time by separately processing depth data for the at least two partial volumes,
based at least on the tracking, recognize actions of the at least two different subjects in the at least two partial volumes, including at least a first action of the first subject and a second action of the second subject,
based at least on the first action and the second action, recognize an interaction between the first subject and the second subject, and
output the recognized interaction.

2. The system of claim 1, wherein the computer-executable instructions further cause the processing device to:
partition the environment into voxels.

3. The system of claim 2, wherein the computer-executable instructions further cause the processing device to:
determine the voxel occupancy by determining whether individual voxels are occupied.

4. The system of claim 1, wherein the computer-executable instructions further cause the processing device to detect the at least two different subjects by:
detecting subject candidates by locating local maxima in the 3D solid volume representation,
establishing respective partial volumes around the subject candidates, and
processing the respective partial volumes to detect the at least two different subjects.

5. The system of claim 4, wherein the computer-executable instructions further cause the processing device to:
use a trained model to classify the respective partial volumes as containing or lacking respective subjects.

6. The system of claim 1, wherein the computer-executable instructions further cause the processing device to:
recognize the actions by applying a trained model to temporal sequences of the at least two partial volumes.

7. The system of claim 6, wherein the computer-executable instructions further cause the processing device to:
recognize the actions by aggregating the depth data sensed over time.

8. The system of claim 1, wherein the computer-executable instructions, when executed by the processing device, cause the processing device to:
recognize the first action for the first subject by inputting a temporal sequence of first depth data for the first partial volume into an action recognition model.

9. The system of claim 8, wherein the temporal sequence reflects different locations of the first partial volume over time.

10. The system of claim 9, wherein the action recognition model is configured to process contextual information in the first partial volume, the contextual information reflecting an object that is present with the first subject in the first partial volume.

11. The system of claim 9, wherein the action recognition model comprises a deep convolutional neural network.

12. The system of claim 11, wherein the deep convolutional neural network is configured to perform recurrent processing that retains hidden state over time.

13. A system, comprising:
multiple 3D cameras positioned relative to an environment to sense depth data of the environment from different viewpoints over time; and,
a processor configured to:
process the depth data to construct a 3D solid volume representation of the environment,
select subjects from the 3D solid volume representation and establish corresponding partial volumes around the subjects, including a first partial volume that includes a first subject and a second partial volume that overlaps the first partial volume and includes a second subject,
recognize actions of the subjects by separately processing the partial volumes, including at least a first action of the first subject and a second action of the second subject, and
based at least on the first action and the second action, recognize an interaction between the first subject and the second subject.

14. The system of claim 13, wherein the processor is further configured to:
include, in both the first partial volume and the second partial volume, a common portion of the 3D solid volume representation.

15. The system of claim 14, wherein the interaction occurs within the common portion of the 3D solid volume representation that is included in both the first partial volume and the second partial volume.

16. The system of claim 14, wherein the processor is further configured to:
recognize the first action and the second action based at least on contextual information within the common portion of the 3D solid volume representation that is included in both the first partial volume and the second partial volume.

17. The system of claim 16, wherein at least a portion of the first subject occupies voxels in the second partial volume.

18. The system of claim 13, wherein first subject is a person and the second subject is an object.

19. The system of claim 18, wherein at least a portion of the object occupies voxels within the first partial volume.

20. A method comprising:

sensing an environment from different viewpoints using multiple 3D cameras;

receiving depth data sensed by the multiple 3D cameras over time;

determining voxel occupancy of the environment from the depth data;

constructing a 3D solid volume representation using the voxel occupancy;

detecting at least two different subjects in the 3D solid volume representation;

establishing at least two partial volumes around the at least two different subjects, including a first partial volume that includes a first subject and a second partial volume that overlaps the first partial volume and includes a second subject;

tracking the at least two different subjects over time by separately processing depth data for the at least two partial volumes;

based at least on the tracking, recognizing actions of the at least two different subjects in the at least two partial volumes, including at least a first action of the first subject and a second action of the second subject;

based at least on the first action and the second action, recognizing an interaction between the first subject and the second subject; and outputting the recognized interaction.

* * * * *